US011766752B2

(12) United States Patent
Piasentin (10) Patent No.: US 11,766,752 B2
(45) Date of Patent: Sep. 26, 2023

(54) METHOD FOR MOUNTING ON A CLAMP WORKPIECES IN PROCESSING CENTERS

(71) Applicant: PROQUADRO S.R.L., Pordenone (IT)

(72) Inventor: Mirko Piasentin, Colle Umberto (IT)

(73) Assignee: TECNO LOGICA S.R.L., Spresiano (IT)

( * ) Notice: Subject to any disclaimer, the term of this patent is extended or adjusted under 35 U.S.C. 154(b) by 176 days.

(21) Appl. No.: 17/428,837

(22) PCT Filed: Dec. 23, 2019

(86) PCT No.: PCT/EP2019/086960
§ 371 (c)(1),
(2) Date: Aug. 5, 2021

(87) PCT Pub. No.: WO2020/164787
PCT Pub. Date: Aug. 20, 2020

(65) Prior Publication Data
US 2022/0126413 A1    Apr. 28, 2022

(30) Foreign Application Priority Data

Feb. 13, 2019    (IT) .................. 102019000002061

(51) Int. Cl.
*B23Q 3/06*    (2006.01)
*B23Q 7/04*    (2006.01)
*B23Q 39/04*    (2006.01)

(52) U.S. Cl.
CPC .............. *B23Q 3/064* (2013.01); *B23Q 7/04* (2013.01); *B23Q 39/046* (2013.01); *B23Q 2240/007* (2013.01)

(58) Field of Classification Search
CPC .................................................. B23Q 39/046
See application file for complete search history.

(56) References Cited

U.S. PATENT DOCUMENTS

2017/0274553 A1    9/2017    Martinez et al.

FOREIGN PATENT DOCUMENTS

| CN | 105729249 A | 7/2016 |
| EP | 1364759 A1 | 11/2003 |
| WO | 00/07768 A1 | 2/2000 |

OTHER PUBLICATIONS

International Search Report and Written Opinion dated Feb. 21, 2020 issued in PCT/EP2019/086960.
Italian Search Report and Written Opinion dated Oct. 18, 2019 issued in IT 201900002061, with partial translation.

*Primary Examiner* — Jacob J Cigna
(74) *Attorney, Agent, or Firm* — Mark M. Friedman (57) ABSTRACT

A method for mounting on a clamp parts or profiles in a processing center provided with a supporting frame for a turntable, comprising a robot for the loading/unloading of the profiles to be worked and of the subsequently worked profiles.
The method provides for the steps of inserting the profile to be worked, by means of the robot, in a region arranged below at least one first open clamp; resting the profile to be worked on at least one first lower fixed reference, resting the profile to be worked on a second and/or third front fixed reference, resting the profile to be worked on at least one fourth lateral fixed reference, laterally closing the profile to be worked and then upper closing of the profile to be worked.

20 Claims, 13 Drawing Sheets

METHOD FOR MOUNTING ON A CLAMP WORKPIECES IN PROCESSING CENTERS

The present invention relates to a method for mounting on a clamp workpieces, such as profiles, in processing centers.

Processing centers are currently known which are usually provided with a supporting structure made of electrowelded structural work; a turntable, for example with four or more stepped positions, is fixed onto said structure.

The so-called stands are assembled in the turntable and their number is dictated by the cycle time.

The operation of loading/unloading the profiles to be worked and already worked is usually performed by an anthropomorphic robot, on the wrist of which a grip hand is fitted which is provided with suckers or pneumatic clamps which have the task of picking up the profile to be worked from a loading basket, placing it in the stand, exiting from the stand in order to allow the rotation of the turntable, reentering to pick up the worked profile, and depositing it in a unloading basket.

The loading and unloading baskets are composed of a frame made of structural work with fixed dimensions, on which outlines made of layered material are assembled which vary their geometry according to the geometry of the profile that they accommodate.

Between the steps for loading the profiles to be worked and for unloading the already worked profiles, there is the placement of the profiles to be worked in the stands of the turntable, or on a mounting system.

For this purpose, US 2017/0274553A1 is known, for example, in which in order to be able to perform the required processes, the thickness and the bevel of the workpiece are measured before a first robot picks up said workpiece.

The first robot is configured to block separately a workpiece which is oriented horizontally; after the workpiece has been locked and removed by a transfer conveyor from the first robot, the latter is configured to reorientate the workpiece in a vertical position in which the adapted ends of the workpiece are directed upward and downward, respectively, and the opposite main surfaces of the workpiece extend on planes that are generally parallel to an arm that receives the workpiece.

The first robot places the vertically oriented workpiece on a shuttle and a second robot is configured to clamp separately the workpieces in their vertical directions, as received from a shuttle associated with a second carousel-type rotating conveyor, and reorientate the workpieces in a horizontal position for placement on the transfer conveyor in a position that is occupied by a workpieces, downstream of the position occupied by the workpiece at which the first locking of the robot receives the workpieces for the first carousel-type rotating conveyor.

However, devices of the known type have drawbacks: an optimum, precise and repeatable positioning of the various workpieces, which are initially mutually identical, and of the workpieces worked in subsequent processes, is not achieved; therefore, for an equal workpiece, nonidentical positions on the stands may be obtained, and this entails inaccuracies in the processes performed.

The aim of the present invention is to solve the described technical problems, eliminating the drawbacks of the cited background art, by devising a method that allows to fix the profiles to be worked or already worked always in the same position, to ensure stability during the movements the basket and facilitate the pickup of said worked profiles.

Within this aim, an object of the invention is to provide a method that allows to optimize the capacity of the loading and unloading basket.

Another object is to obtain a method that can also adopt mutually different profiles to be worked or already worked always in the same position.

Another object is to obtain a method that can also be applied to usual and known apparatuses for mounting on a clamp parts or profiles to be worked or already worked in a processing center.

This aim and these objects, as well as others which will become better apparent hereinafter, are achieved by a method for mounting on a clamp parts or profiles to be worked or already worked in a processing center provided with a supporting frame for a turntable with two or more stepped positions or stands or machining stations, comprising a robot, which is anthropomorphic on the wrist, for the loading/unloading of said profiles to be worked and of the subsequently worked profiles, from a loading basket toward an unloading basket with multiple receptacles, characterized in that it comprises the following steps:

inserting said profile to be worked, by means of said robot, in a region arranged below at least one first open clamp that is present in said stand;

resting said profile to be worked on at least one first lower fixed reference provided on a fixed front jaw of said at least one first open clamp;

resting said profile to be worked on a second and/or third front fixed reference present on said fixed front jaw of said at least one first open clamp;

resting said profile to be worked on at least one fourth lateral fixed reference present on one side of said fixed front jaw of said at least one first open clamp;

lateral closing of said profile to be worked by means of a first movable presser associated with said stand;

upper closing of said profile to be worked by means of at least one second presser associated with said stand;

front closing of said profile to be worked by means of the movement of the second jaw of said at least one first clamp.

Further characteristics and advantages of the invention will become better apparent from the detailed description of a particular but not exclusive embodiment, illustrated by way of nonlimiting example in the accompanying drawings, wherein.

In the exemplary embodiments that follow, individual characteristics, given in relation to specific examples, may actually be interchanged with other different characteristics that exist in other exemplary embodiments.

With reference to the figures, the reference numeral 1 designates a processing center provided with a supporting structure or frame 2, made of electrowelded structural work, on which a turntable 3 is fixed which has multiple stepped positions or stands or machining stations 4 for the mounting of workpieces, such as profiles to be worked 5 or already worked profiles 6.

In the particular embodiment shown, a turntable 3 has been considered which can be of the type for example with four or eight stepped positions or stands and is provided for example with three stations dedicated to processing and one to the loading/unloading of the profiles to be worked 5 and the already worked profiles 6.

Figure 1:
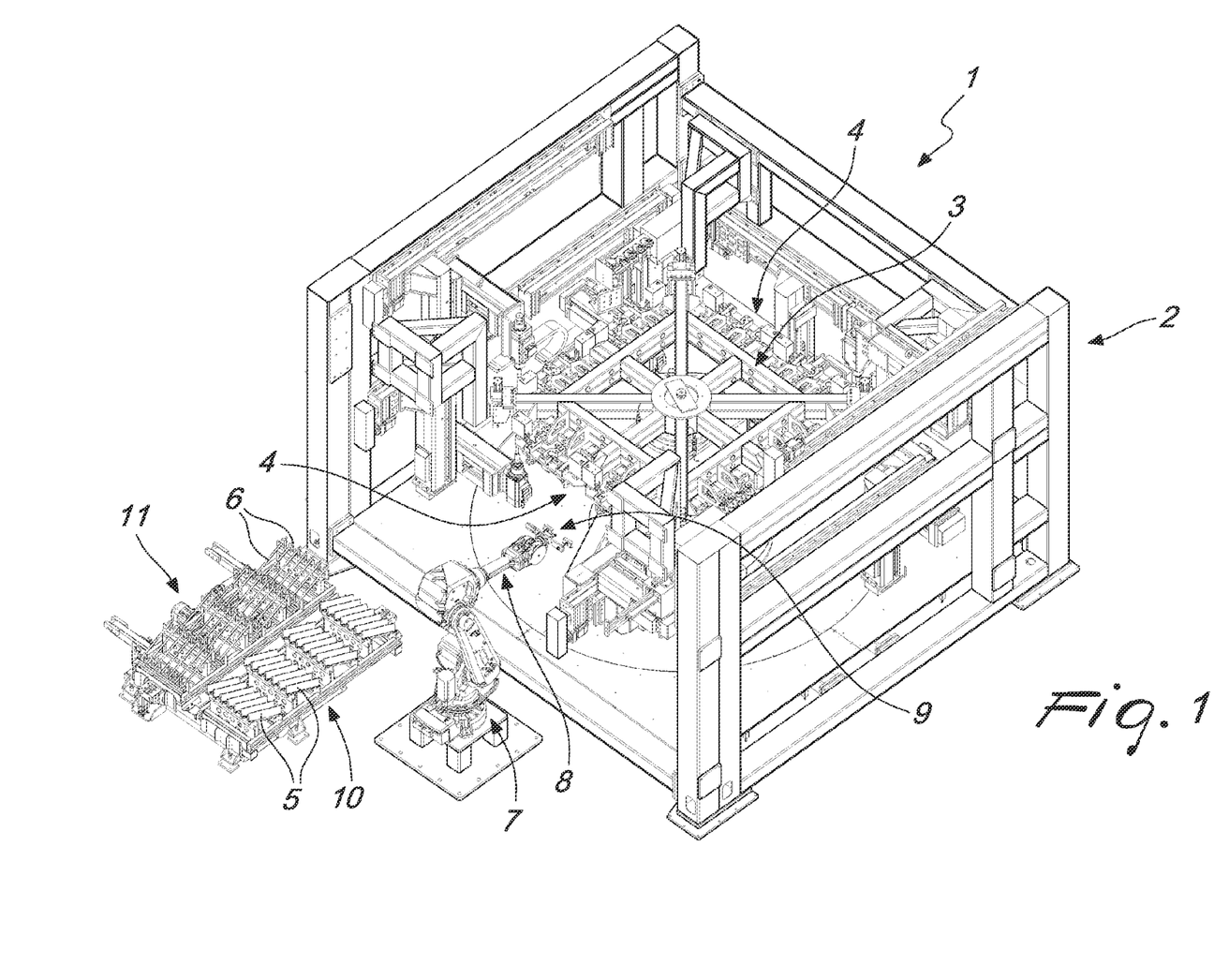
FIG. 1 is a view of a processing center comprising a robot, a loading basket and an unloading basket.
Figure 2:
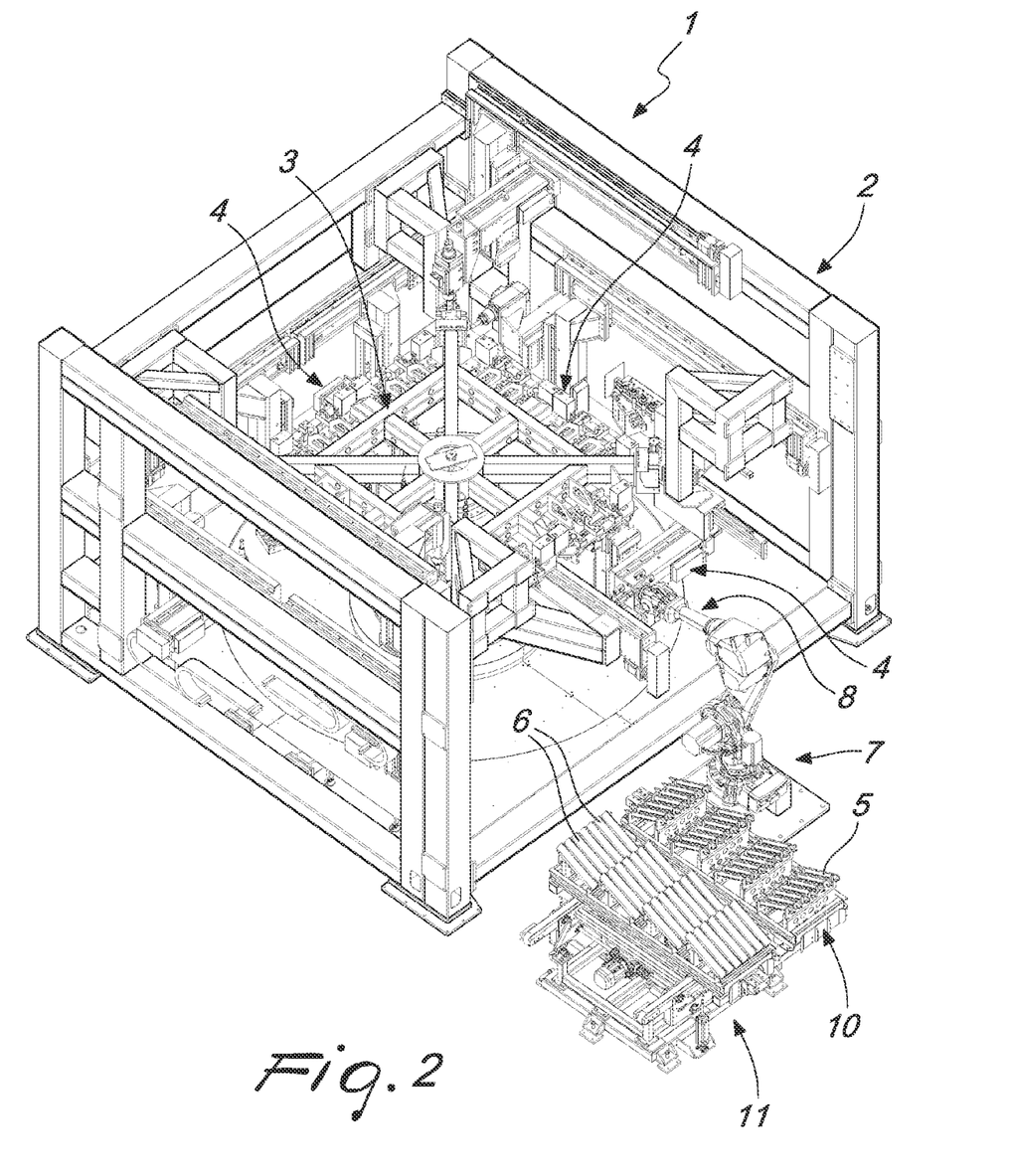
FIG. 2 is a view, similar to the preceding one, of the robot that has positioned a profile in the device.
Figure 3:
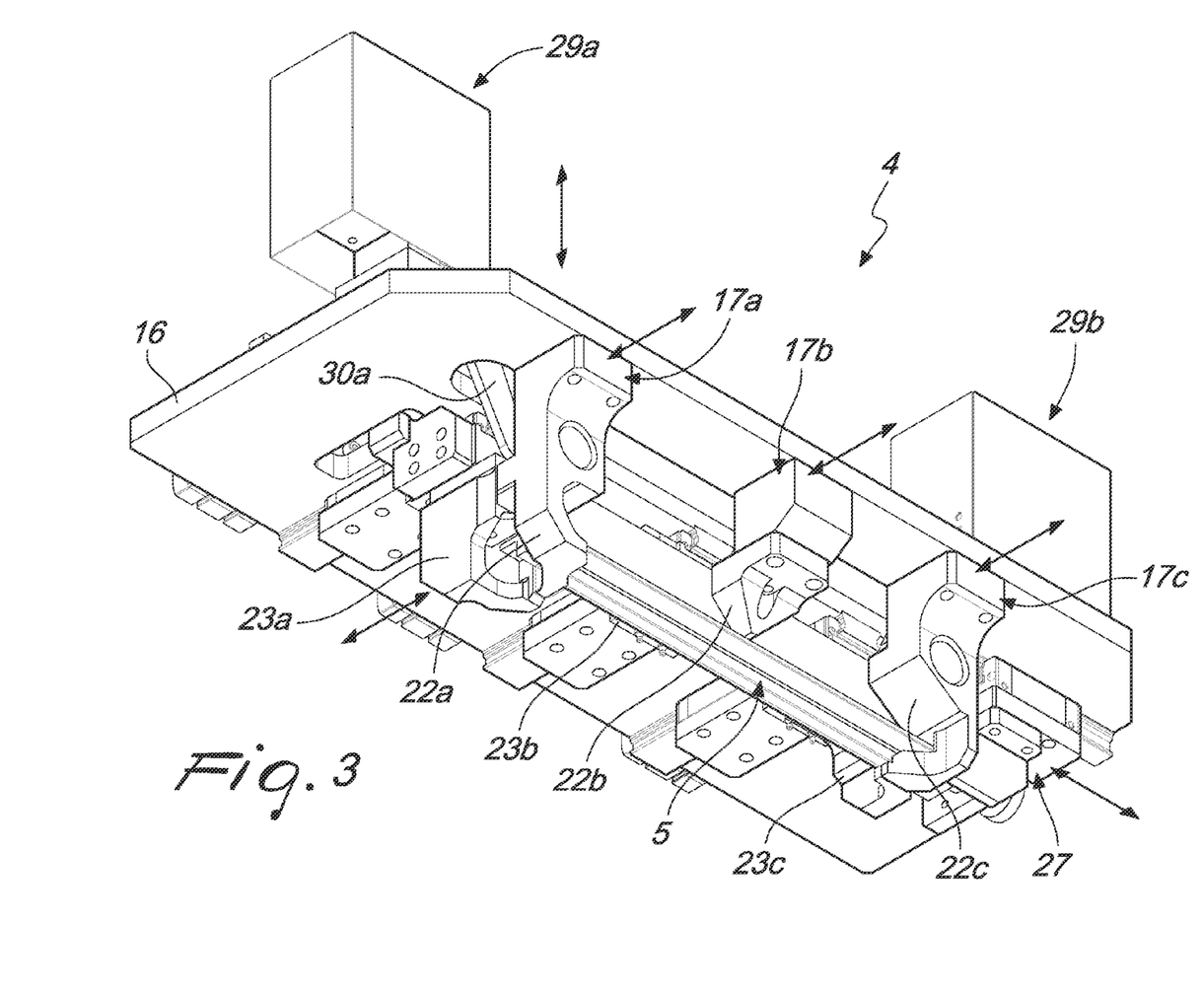
FIG. 3 is a perspective view from below of the device in which, for the sake of clarity, only the profile inside it has been positioned.
Figure 4:
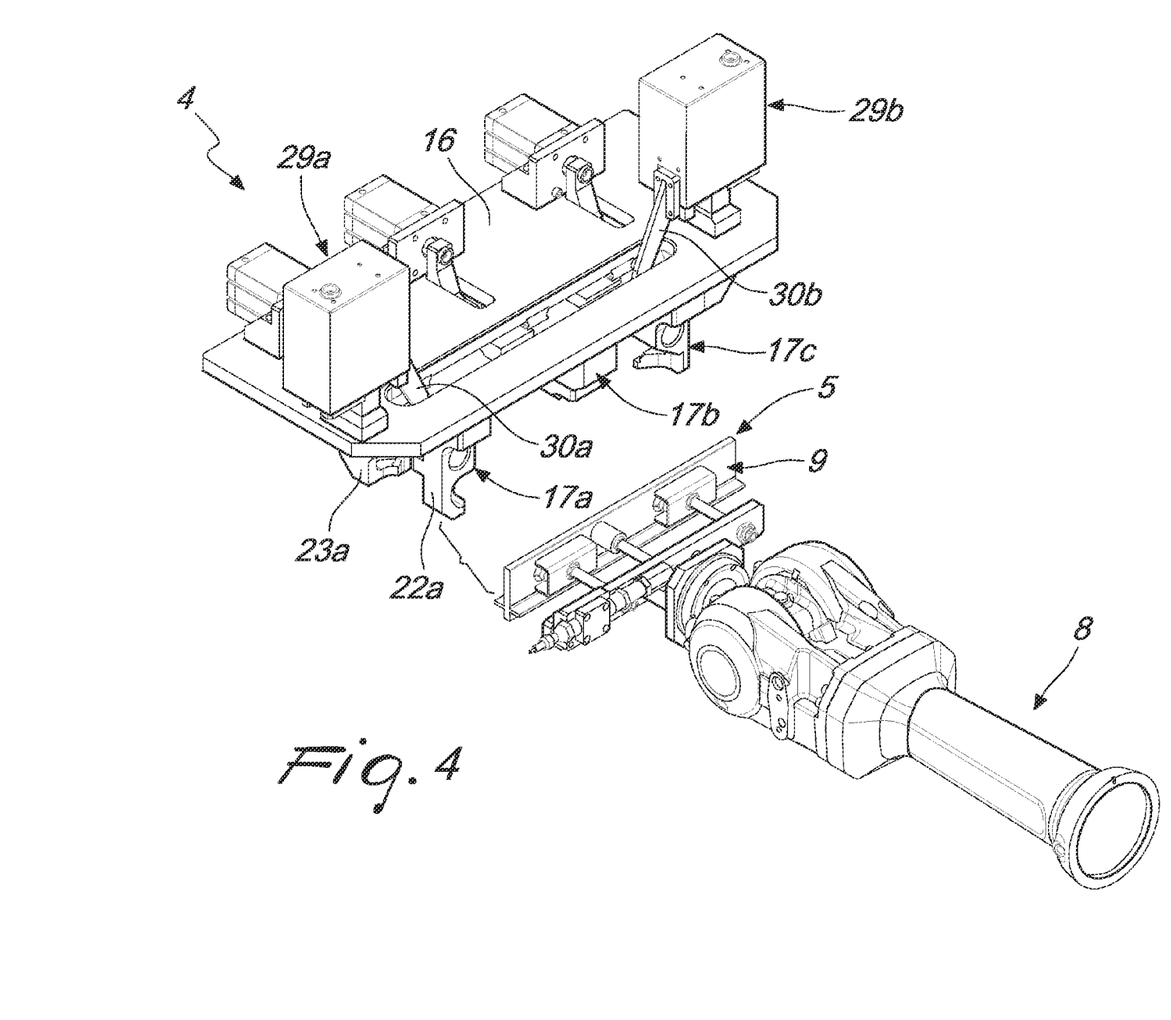
FIGS. 4 and 5 are a lateral perspective view and a side view of a step that is preliminary to the insertion of the profile in the device.
Figure 5:
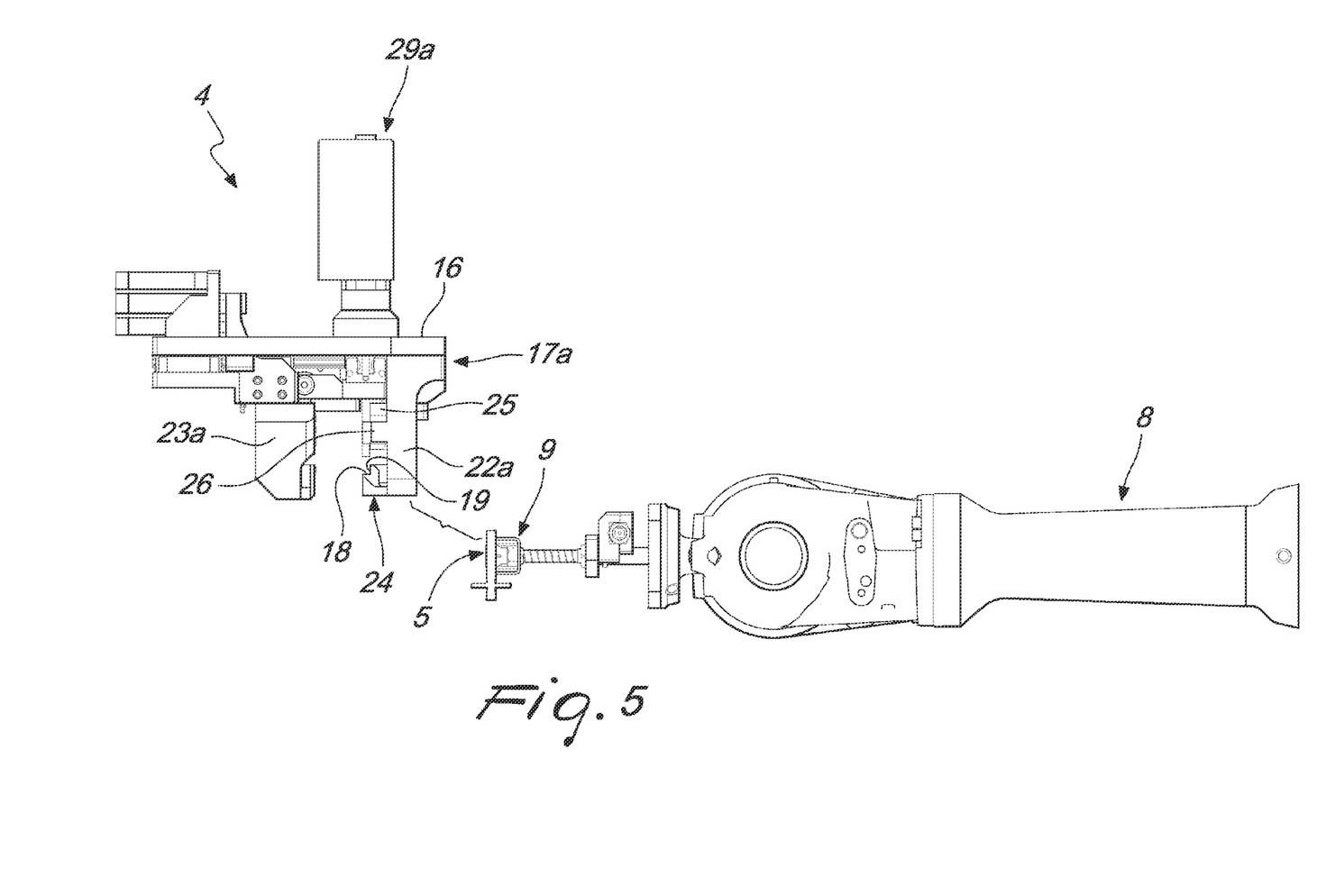
Figures 6, 7:
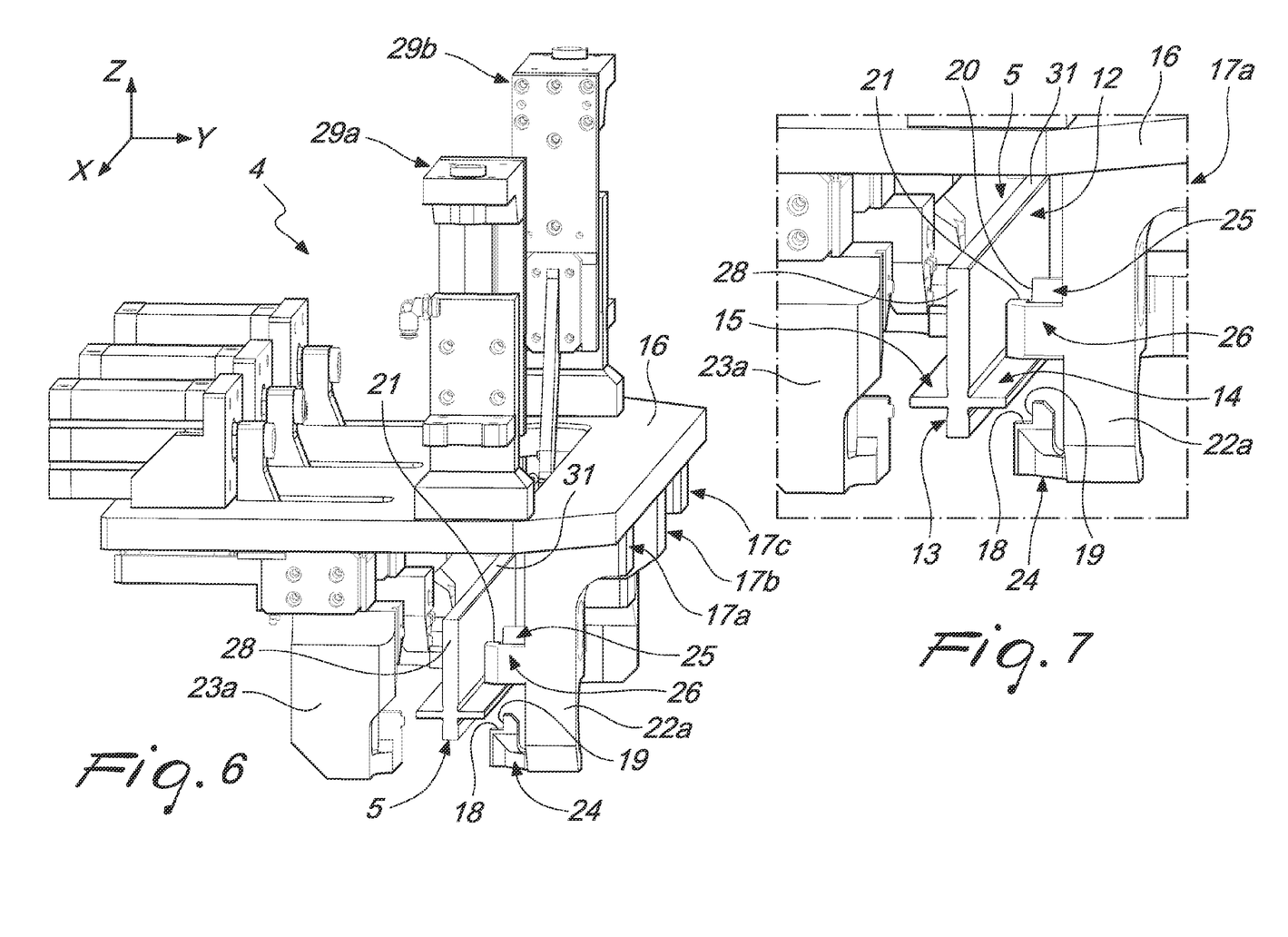
FIG. 6 is a lateral perspective view of the device in the step for the insertion of the profile to be worked.
FIG. 7 is a view of a detail of FIG. 6.
Figure 8:
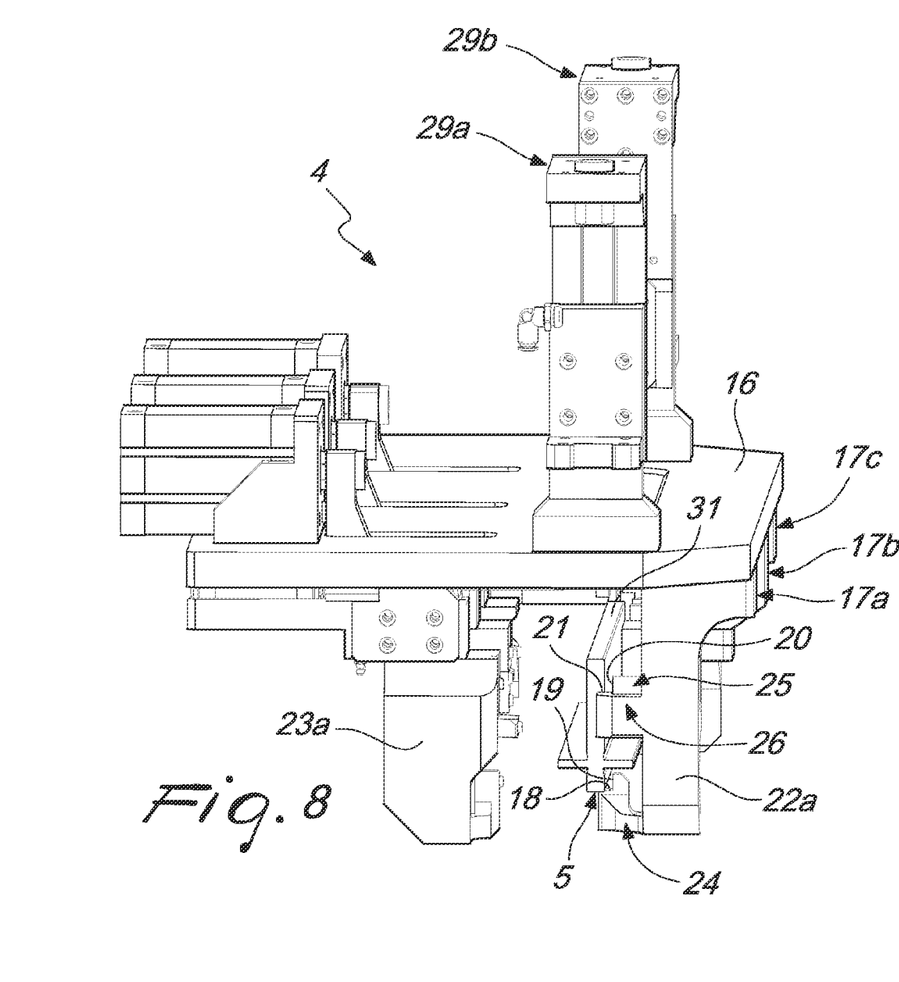
FIG. 8 is a lateral perspective view of the device in the step for the resting of the profile to be worked on a lower fixed reference.

The operation for loading/unloading the profiles 5 to be worked and the already worked profiles 6 is performed by a robot 7 which is anthropomorphic on the wrist and on which a grip hand 8 is fitted and provided with pneumatic clamps or suckers 9 which have the task of picking up the profile to be worked 5 from a loading basket 10, positioning it in a chosen stand, exiting from the stand in order to allow the rotation of the turntable 3, reentering to pick up the worked profile 6, and depositing it in an unloading basket 11.

In order to optimize the capacity of the loading and unloading baskets 10, 11, fix the profiles to be worked 5 and the already worked profiles 6 always in the same position, ensure stability during the movements of the basket 10, 11 and facilitate pickup, the profiles 5, 6 are preferably inclined on two different planes, utilizing resting by gravity.

In order to achieve these aims, six different reference points, also known as RPS (Reference Positioning System), and the corresponding leveling pushers, actuated by movable pressers, which allow to retain the profile in all directions, have been defined for each profile 5, 6.

The position of the RPS has been studied carefully in order to achieve the set aims and allow the processes with the machine tools required by the profile.

In the particular exemplifying embodiment, the profile 5 has, in cross-section, the shape of an inverted cross, which is shown only to provide an illustration and a description, but with the specification that this is one of the possible shapes that the profile 5 can assume.

Such profile therefore forms a vertical wing, which is divided into a larger upper vertical wing 12 and a smaller lower vertical wing 13, intersected by a horizontal wing, divided into a front side wing 14 and a rear side wing 15.

One particularity of the stands 4 is the positioning of the profiles 5, 6.

The RPS are arranged in a plate 16, which is integral with the carousel 3, and are physically constituted by mechanical components capable of arranging themselves in said six different reference points, and therefore are designed to support and mount with precision, allow the insertion and unloading of the profiles 5, 6, and allow the processes and the measurements that are necessary.

In all the stands 4, the profiles 5, 6 are arranged initially below an appropriately shaped surface, such as a plate 16, on which the fixed and movable mountings are assembled.

This solution allows the chips inevitably produced by the processes to fall to the ground, where they are collected by a conveyance system, ensuring maximum cleanliness of the work area, and also allows the loading of the profiles from the bottom upward.

In order to mount the profile 5, 6, it is necessary to retain its six faces.

The fixed RPS are therefore references or resting points for the grip hand 8 of the robot 7 which is handling the profile 5, 6 and their purpose is to always have a fixed "zero" reference.

As is evident from the accompanying figures, the method provides for a first step, in which said profile to be worked 5 is inserted, by means of said robot 7, in a region arranged below the plate 16 at a region formed in the interspace between first initially open clamps 17a, 17b, 17c; the positioning of the profile 5 between the first clamps, which are arranged below said plate 16, is thus allowed.

The plate 16 is provided with three RPS or reference points which are fixed, respectively on the right, at the center and on the left of the stand, and their position does not allow, as noted, the front loading of the profile 5 in the stand, but allows it from below.

There is therefore a first lower fixed reference or RPS 18, a second and/or third front fixed reference or RPS 19, 20, and a fourth lateral fixed reference or RPS 21, which protrude from the fixed front jaw 22a, 22b, 22c of the first clamps 17a, 17b, 17c toward the facing movable rear jaw 23a, 23b, 23c thereof.

The shape and arrangement of the first, second and/or third and fourth references depend on the shape of the profiles 5, 6; in the particular embodiment, the first lower fixed reference or RPS 18 and the second front fixed reference or RPS 19 are formed at the terminal end, which is appropriately L-shaped, of a first wing 24 which protrudes in front of said fixed front jaw 22a, 22b, 22c proximate to their lower end.

The third front fixed reference or RPS 20 is instead formed at the terminal end of a second wing 25, which is shaped appropriately and protrudes in front of said fixed front jaw 22a, 22b, 22c proximate to their upper end.

The fourth lateral fixed reference or RPS 21 is formed at the terminal end, directed at right angles to said first and second wings 24, 25, of a third wing 26 which protrudes in front of said fixed front jaw 22a, 22b, 22c proximate to a region that is adjacent to said upper end.

The first lower fixed reference or RPS 18 acts as a reference for the Z axis, while the second and/or third references act as a reference in the direction Y and the fourth lateral fixed reference or RPS 21 acts as a reference in the direction X.

Figure 9:
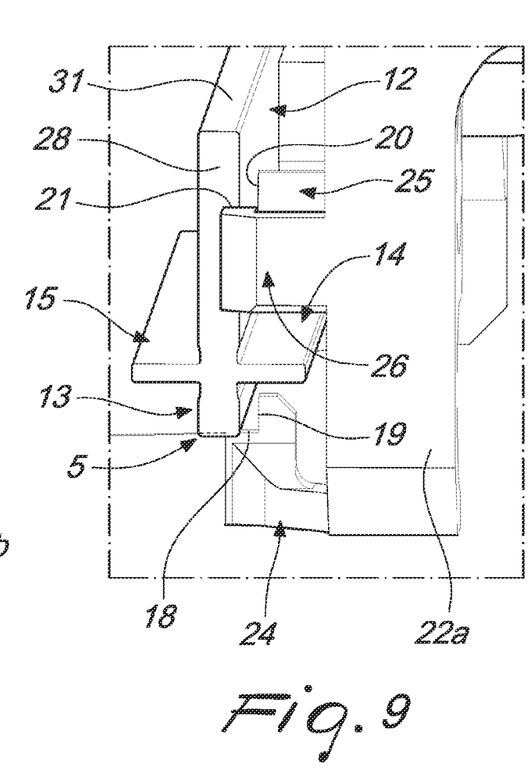
FIG. 9 is a view of a detail of FIG. 8.

The method in fact provides for a second step, shown in FIG. 9, in which the grip hand of the robot 7 rests the profile to be worked 5 on the first lower fixed reference 18 in order to perform the first leveling on the Z axis.

Figures 10, 11:
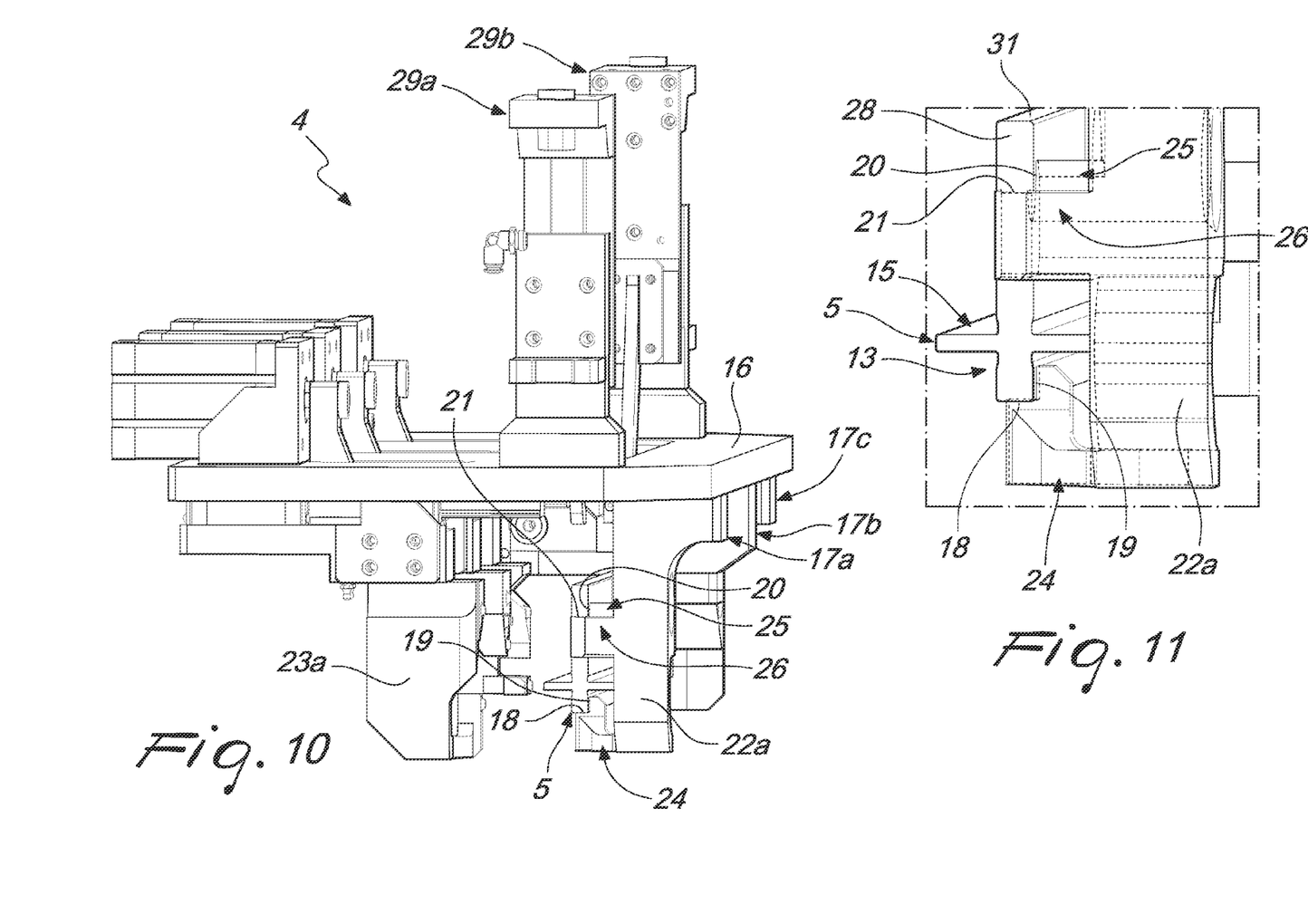
FIG. 10 is a lateral perspective view of the device in the step for resting the profile to be worked on a front fixed reference.
FIG. 11 is a view of a detail of FIG. 10.
Figure 12:
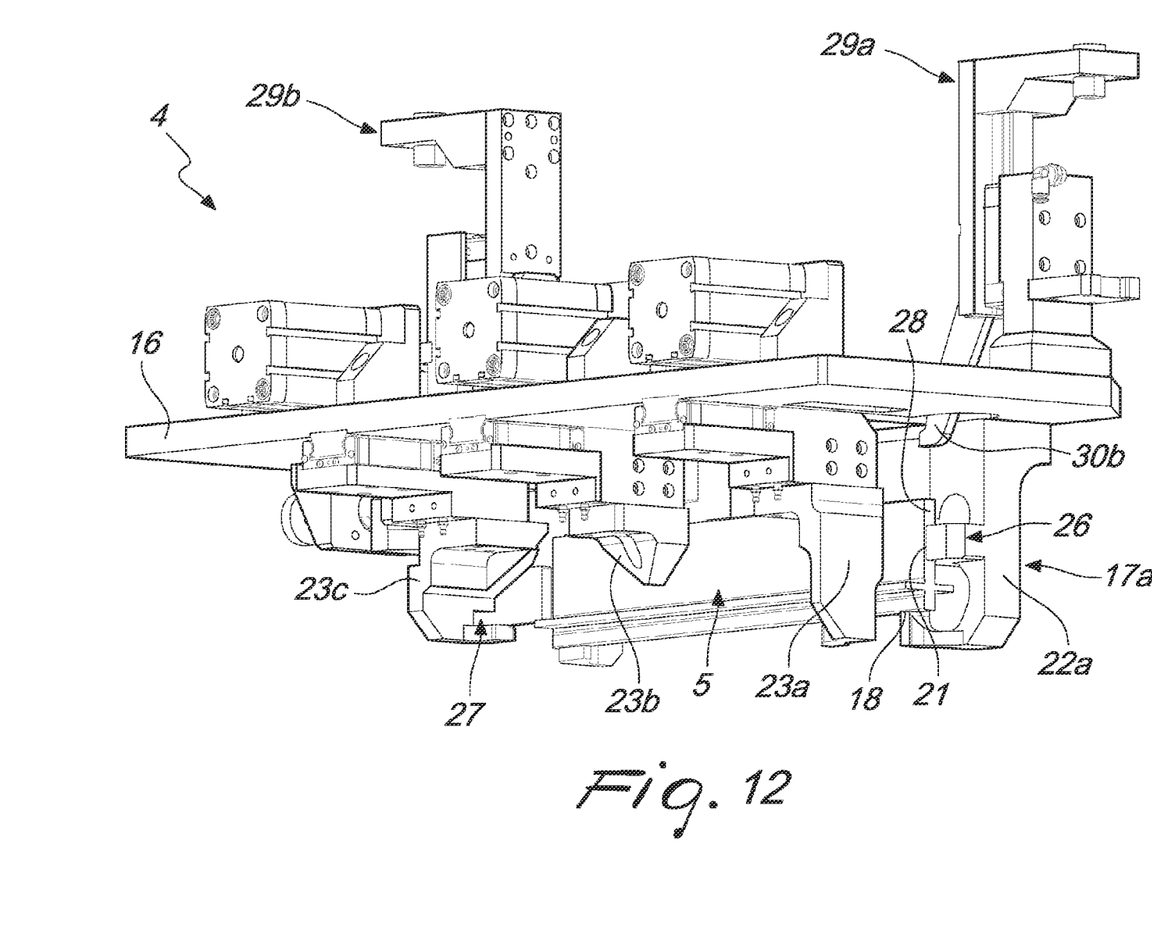
FIG. 12 is a lateral perspective view of the device in the step for resting the profile to be worked on a lateral fixed reference.

This is followed by a further step, shown in FIG. 11, in which the grip hand of the robot 7 rests the profile to be worked 5 on the second and/or third front fixed reference 19, 20 in order to obtain leveling on the Y axis.

Figure 13:
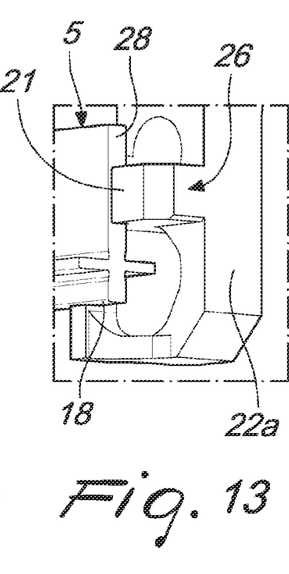
FIG. 13 is a view of a detail of FIG. 12.

This is followed by a further step, shown in FIG. 13, in which the grip hand 8 of the robot 7 rests the profile to be worked 5 on the fourth lateral fixed reference 21 in order to perform the first leveling on the X axis.

Figure 14:
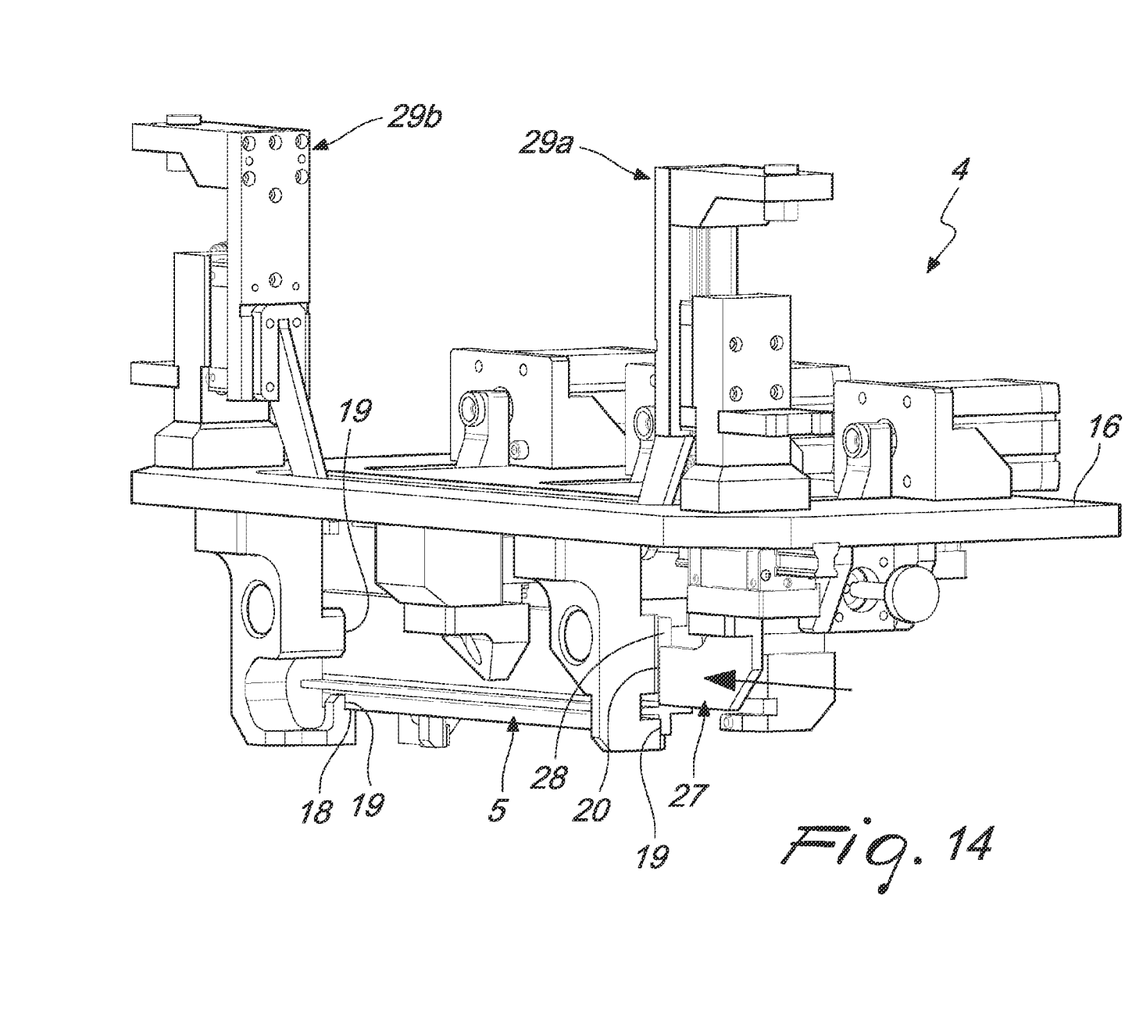
FIG. 14 is a lateral perspective view of the device in the step for closing the profile to be worked on a lateral movable reference.
Figure 15:
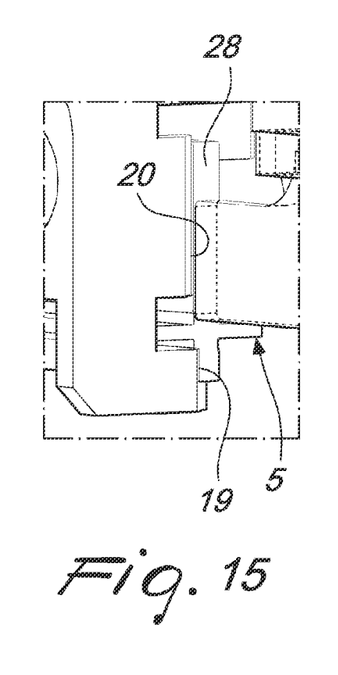
FIG. 15 is a view of a detail of FIG. 10.
Figure 16:
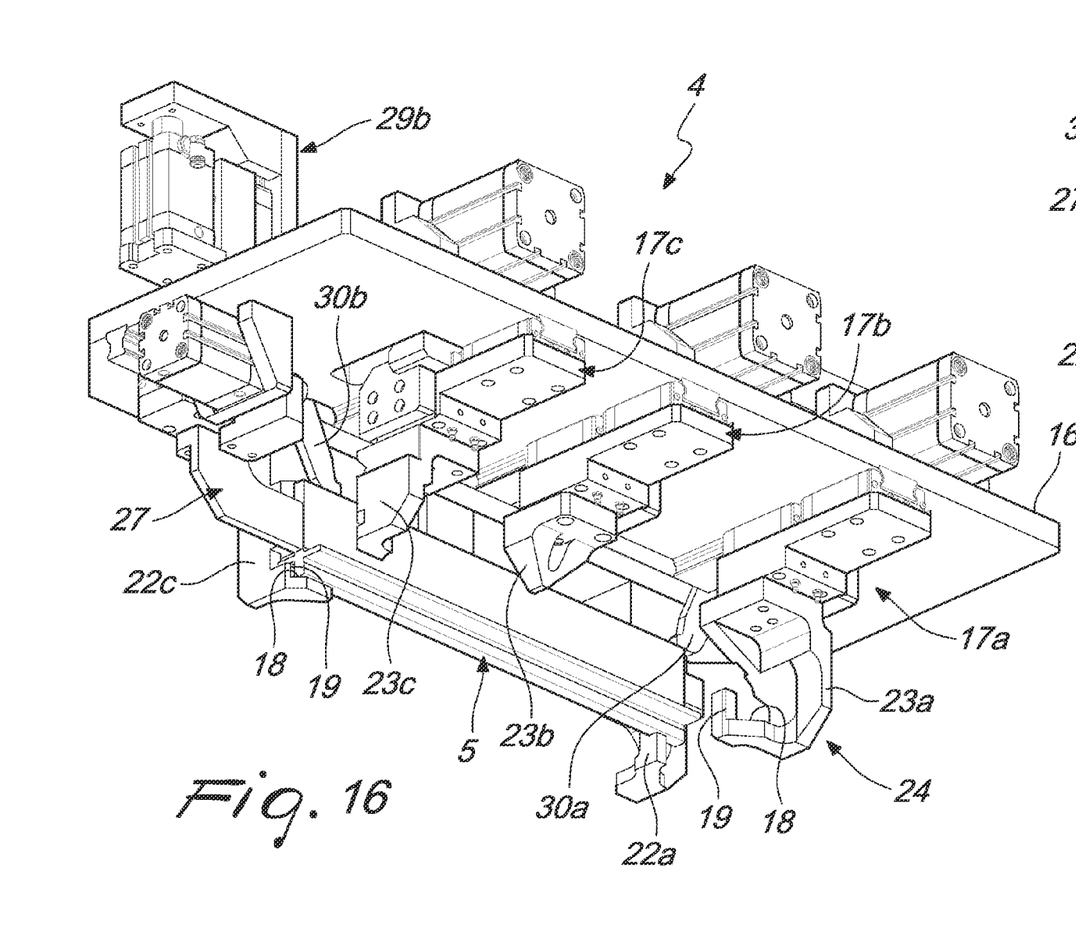
FIG. 16 is a perspective view from below of the device in the step for closing the profile to be worked between the lower fixed reference and an upper movable reference by means of an upper presser.
Figure 17:
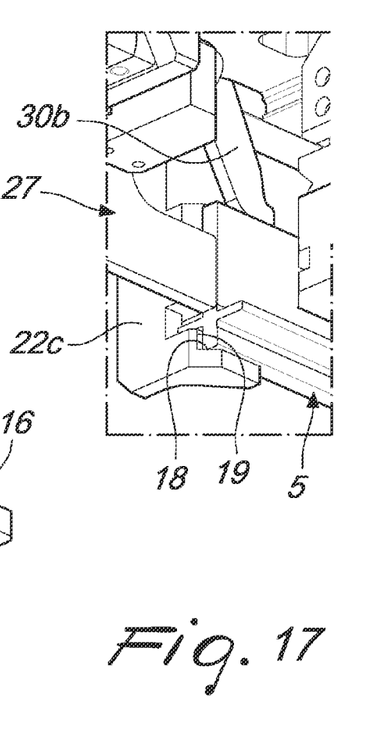
FIG. 17 is a view of a detail of FIG. 10.

This is followed by a further step, shown in FIG. 14, in which the lateral closure of the profile to be worked 5 is forced by means of a first movable presser 27, associated with the plate 16, the terminal end of which rests and interacts with the lateral surface 28 of said profile to be worked 5.

Figure 18:
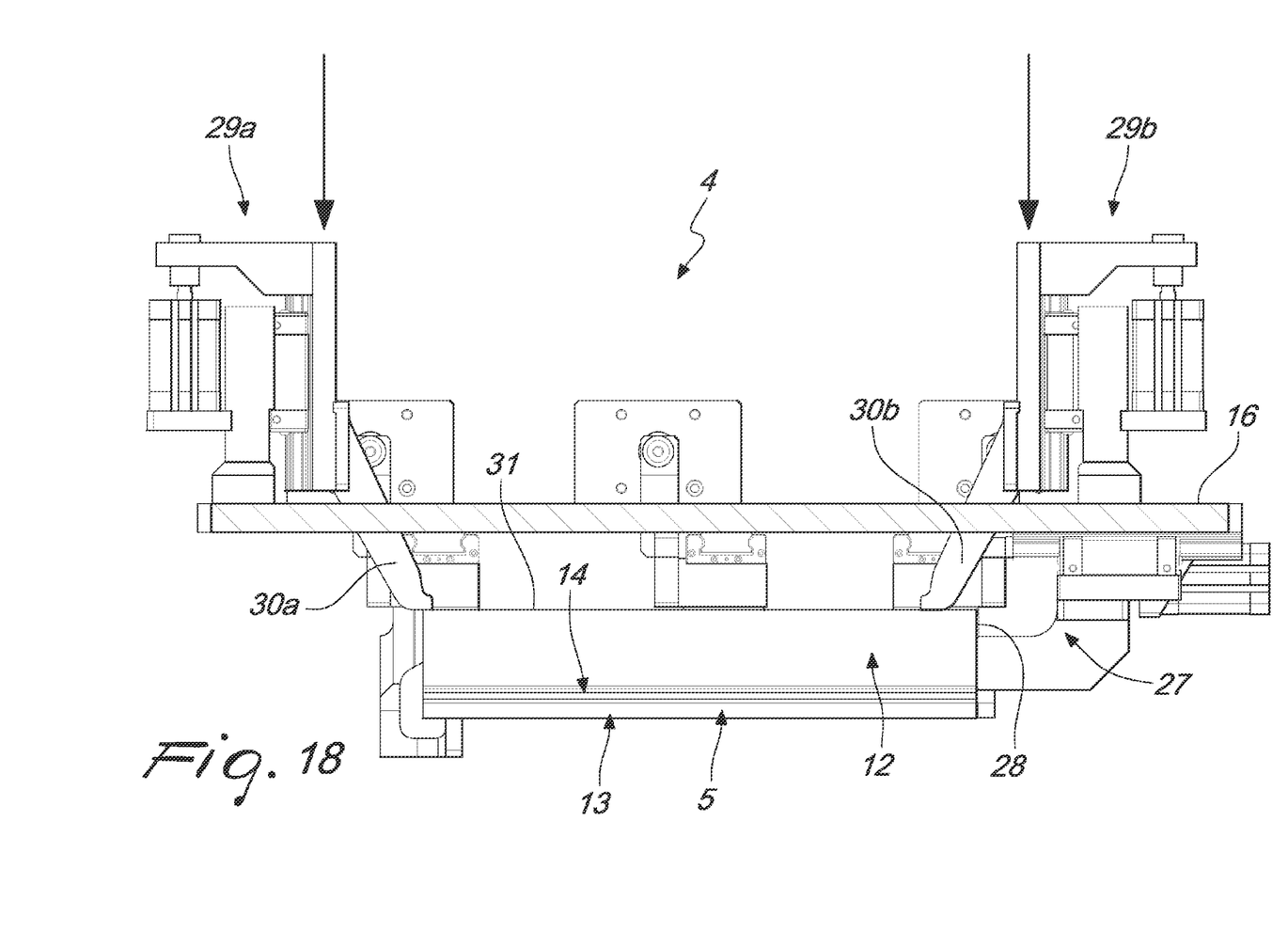
FIG. 18 is a front view of the device of FIG. 16.

This is followed by a further step, shown in FIG. 18, in which the upper closure of said profile to be worked 5 is forced by means of a pair of second pressers 29a, 29b associated with said plate 16 and provided with arms 30a, 30b which protrude in a region that lies above the upper lateral surface 31 of said profile to be worked 5.

Figures 19, 20:
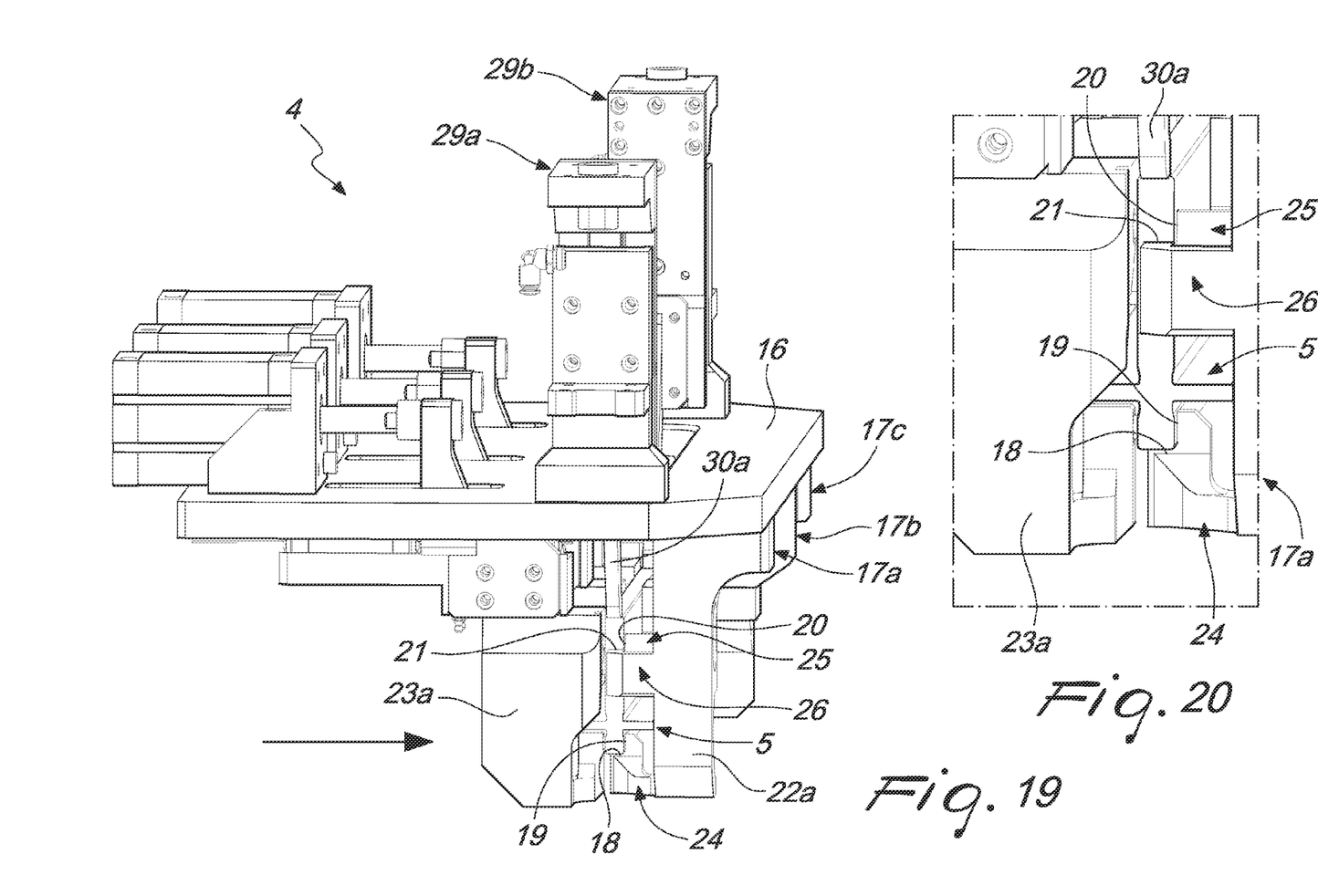
FIG. 19 is a lateral perspective view of the device in the step for closing the profile to be worked on front references.
FIG. 20 is a view of a detail of FIG. 19.

This is followed by a further step, shown in FIG. 19, in which the front closure of said profile to be worked 5 is forced by means of the movement of the second movable rear jaw 23a, 23b, 23c of said first clamps 17a, 17b, 17c, which constitutes a front reference.

The perfect mounting of the profile is thus ensured.

It is specified that the grip hand of the robot 7, the loading and unloading baskets 10, 11 and the stands 4 are designed to serve profiles 5, 6 having a shape which is even different from the one shown, with the addition, where necessary, of fixed and/or movable parts which must be compatible with the space occupation required for the execution of the processes on the parts, such as for example the space occupation of the spindles and of the milling cutters.

Once the profile to be worked 5 has undergone the subsequent provided processes, the movable RPS open in order to allow the pickup of the worked profile 6 and the insertion of the new profile to be worked 5.

The loading and unloading basket 10, 11 can contain a finite number of profiles 5, 6 and when the robot 7 has picked them all up it will be necessary to replace it.

It has thus been found that the invention has achieved the intended aim and objects, a method having been obtained which allows to fix the profiles to be worked and already worked always in the same position, to ensure stability during the movements of the basket, and to facilitate the pickup of said worked profiles.

Furthermore, the method allows to optimize the capacity of the loading and unloading basket, since it is possible to also adopt profiles to be worked and already worked which are mutually different, always in the same position.

The materials used as well as the dimensions that constitute the individual components of the invention may of course be more pertinent according to the specific requirements.

The characteristics indicated as advantageous, convenient or the like may also be omitted or be replaced with equivalents.

The disclosures in Italian Patent Application No. 102019000002061 from which this application claims priority are incorporated herein by reference.

The invention claimed is:

1. A method for mounting on a clamp parts or profiles to be worked or already worked in a processing center provided with a supporting frame for a turntable with two or more stepped positions or stands or machining stations, comprising a robot, which is anthropomorphic on a wrist, for loading or unloading said parts or profiles to be worked and of subsequently worked parts or profiles, from a loading basket toward an unloading basket with multiple receptacles, comprising the following steps:

inserting said part or profile to be worked, by means of said robot, in a region arranged below at least one first open clamp that is present in one of said stands or stepped positions or machining stations;

resting said part or profile to be worked on at least one first lower fixed reference provided on a fixed front jaw of said at least one first open clamp;

resting said part or profile to be worked on a second and/or third front fixed reference present on said fixed front jaw of said at least one first open clamp;

resting said part or profile to be worked on at least one fourth lateral fixed reference present on one side of said fixed front jaw of said at least one first open clamp;

lateral closing of said part or profile to be worked by means of a first movable presser associated with said stand;

upper closing of said part or profile to be worked by means of at least one second presser associated with said stand;

front closing of said part or profile to be worked by means of the movement of the second jaw of said at least one first clamp.

2. The method according to claim 1, wherein a first fixed or lower reference, a second and/or third front fixed reference and a fourth lateral fixed reference are provided and protrude from a fixed front jaw of said first clamps which is directed toward a facing second rear and movable jaw thereof, the shape and arrangement of said first, second and/or third and fourth references depending on the shape of said parts or profiles.

3. The method according to claim 2, wherein in an additional step the front closure of said part or profile to be worked is forced by means of the movement of said second jaw of said first clamps which constitutes a front reference.

4. The method according to claim 2, wherein said first lower fixed reference and said second front fixed reference are formed at a terminal end, which is L-shaped, of a first wing which protrudes in front of said fixed front jaw proximate to a lower end of said fixed front jaw.

5. The method according to claim 4, wherein said fourth lateral fixed reference is formed at the terminal end, directed at right angles to said first and second wings, of a third wing which protrudes at a front of said fixed front jaw proximate to a region that is adjacent to said upper end.

6. The method according to claim 2, wherein said third front fixed reference is formed at a terminal end of a second wing, which protrudes at the front of said fixed front jaw proximate to an upper end of said fixed front jaw.

7. The method according to claim 6, wherein said fourth lateral fixed reference is formed at the terminal end, directed at right angles to said first and second wings, of a third wing which protrudes at a front of said fixed front jaw proximate to a region that is adjacent to said upper end.

8. The method according to claim 2, wherein said first lower fixed reference acts as a reference for a Z axis, while said second and/or third reference act as a reference in a Y direction and said fourth lateral fixed reference acts as a reference in a X direction, the Z axis, the Y direction and the X direction forming a triplet of axes mutually orthogonal to each other.

9. The method according to claim 8, wherein said grip hand of said robot rests said part or profile to be worked on said first lower fixed reference in order to perform a first leveling on the Z axis, then said grip hand of said robot rests said part or profile to be worked on said second and/or third front fixed reference in order to obtain a leveling on the Y axis, then said grip hand of said robot rests said part or profile to worked on said fourth lateral fixed reference in order to perform a first leveling on the X axis.

10. The method according to claim 1, wherein said part or profile to be worked, arranged in said region located below at least one first open clamp, is provided with six different reference points or mountings, of which some are fixed and some others are movable, adapted to allow to retain said part or profile in all directions.

11. The method according to claim 10, wherein said fixed and movable mountings retain six faces of said parts or profiles, said fixed mountings being references or resting points for a grip hand of said robot in order to always have a fixed zero reference.

12. The method according to claim 11, wherein said grip hand of said robot rests said part or profile to be worked on said first lower fixed reference in order to perform a first leveling on the Z axis, then said grip hand of said robot rests said part or profile to be worked on said second and/or third front fixed reference in order to obtain a leveling on the Y axis, then said grip hand of said robot rests said part or profile to worked on said fourth lateral fixed reference in order to perform a first leveling on the X axis.

13. The method according to claim 10, wherein in all of said stands or stepped positions or machining stations said parts or profiles are arranged initially below a shaped surface on which said fixed and movable reference points or mountings are assembled.

14. The method according to claim 13, wherein said shaped surface is a plate.

15. The method according to claim 13, wherein said part or profile to be worked is inserted in a region arranged below said shaped surface at a region that is defined in an interspace between said first clamps, which are initially open, said shaped surface being provided with three fixed reference points or mountings, respectively to the right, at the center and to the left of the respective stand, their position allowing the loading of said part or profile from below.

16. The method according to claim 15, wherein said shaped surface is a plate.

17. The method according to claim 13, wherein in a further step a lateral closure of said part or profile to be worked is forced by means of a first movable presser, associated with said shaped surface, a terminal end of which rests against and interacts with a lateral surface of said part or profile to be worked.

18. The method according to claim 17, wherein said shaped surface is a plate.

19. The method according to claim 17, wherein in a further step an upper closure of said part or profile to be worked is forced by means of a pair of second pressers which are associated with said shaped surface and provided with arms which protrude in a region that lies above an upper lateral surface of said part or profile to be worked.

20. The method according to claim 19, wherein said shaped surface is a plate.

* * * * *